United States Patent

Ikegaya et al.

[11] Patent Number: 5,229,508
[45] Date of Patent: Jul. 20, 1993

[54] PROCESS FOR THE PREPARATION OF COOPER PHTHALOCYANINE PIGMENT

[75] Inventors: Toshimitsu Ikegaya; Yusaku Ide; Tsuneo Kawamura; Michichika Hikosaka, all of Tokyo, Japan

[73] Assignee: Toyo Ink Manufacturing Co., Inc., Tokyo, Japan

[21] Appl. No.: 807,087

[22] Filed: Dec. 13, 1991

Related U.S. Application Data

[63] Continuation of Ser. No. 483,236, Feb. 21, 1990, abandoned.

[51] Int. Cl.$^5$ ............................................. C09B 47/04
[52] U.S. Cl. ..................... 540/141; 106/410; 106/412; 540/144
[58] Field of Search ................. 540/141, 144; 106/410, 106/412

[56] References Cited

U.S. PATENT DOCUMENTS

| | | | |
|---|---|---|---|
| 2,334,812 | 11/1943 | Detrick et al. | 106/412 |
| 3,087,935 | 4/1963 | Razavi et al. | 540/144 |
| 3,267,116 | 8/1966 | Braun | 540/141 |
| 3,936,315 | 2/1976 | Ferrill, Jr. et al. | 106/412 |
| 3,954,795 | 5/1976 | Jackson | 106/412 |
| 4,104,276 | 8/1978 | Kranz et al. | 106/412 |
| 4,298,526 | 11/1981 | Sappok et al. | 106/412 |
| 4,386,966 | 6/1983 | Fitzgerald | 106/410 |

OTHER PUBLICATIONS

Moser et al. The Phthalocyanines, vol. 1, [1990, Boca Raton, FL, CRC Press] p. 26.

*Primary Examiner*—Mukund J. Shah
*Assistant Examiner*—E. C. Ward
*Attorney, Agent, or Firm*—Bucknam and Archer

[57] ABSTRACT

A process for the preparation of a copper phthalocyanine pigment, which comprises dry grinding crude copper phthalocyanine, treating the dry ground crude copper phthalocyanine with an aqueous solution of a mineral acid under such conditions of acid concentration and temperature as not to transform the $\beta$ form contained in the ground crude copper phthalocyanine into the $\alpha$ one to thereby carry out the pigmentation and removing the mineral acid from the resulting mixture.

11 Claims, No Drawings

PROCESS FOR THE PREPARATION OF COOPER PHTHALOCYANINE PIGMENT

This is a continuation of application Ser. No. 483,236, filed Feb. 21, 1990, now abandoned.

BACKGROUND OF THE INVENTION

1. Field of the Invention

The present invention relates to a process for the preparation of a copper phthalocyanine pigment having the $\beta$ form alone or one having both $\alpha$ and $\beta$ forms mixedly. More particularly, it relates to a process for the preparation of a copper phthalocyanine pigment having the $\beta$ form alone or one having both $\alpha$ and $\beta$ forms mixedly, which comprises dry grinding crude copper phthalocyanine and dipping or wet grinding the thus obtained dry ground copper phthalocyanine in an aqueous solution of a mineral acid.

2. Description of the Prior Art

Crude copper phthalocyanine prepared by the synthesis in an organic solvent according to the prior art is composed of coarse primary particles, so that it exhibits poor clarity and poor color strength when dispersed in various vehicles, thus being lowly valuable as a colorant. Accordingly, such crude copper phthalocyanine must be divided more finely prior to the application thereof to various fields.

When crude copper phthalocyanine as described above is ground in a ball mill or vibrating mill, it is gradually converted into amorphous one. Further, as the grinding thereof proceeds, the grinding agglomeration becomes more intensive, so that the resulting ground copper phthalocyanine exhibits only very low color strength when dispersed in a vehicle, owing to the high agglomerating power thereof. As a process for preparing the $\beta$-type pigment, for example, Japanese Patent Application Laid-Open No. (sho.) 52-69435 discloses a process of treating crude copper phthalocyanine exhibiting intensive grinding agglomeration in a crystallizing solvent such as xylene or an aqueous emulsion thereof to carry out the pigmentation through crystal transformation. However, this process has a disadvantage in that when ground crude copper phthalocyanine is dipped in a crystallizing solvent or an aqueous emulsion thereof, the particles thereof cause excessive crystal growth to result in coarse particles again.

As a wet grinding process for preparing the $\beta$-type pigment, a process of grinding crude copper phthalocyanine with a kneader or a mixer in the presence of a polyol (a conditioning medium) has been known. However, this process is also disadvantageous in that the grinding takes a long time to result in enhanced power consumption. Thereafter, although various improved processes, for example, (a) process of adding ferric chloride (Japanese Patent Application Laid-Open No. (sho.) 51-134722).

(b) process of adding an alkali hydroxide (Japanese Patent Application Laid-Open No. (sho.) 51-69524) and (c) process of adding calcium chloride as a viscosity stabilizer together with a grinding aid such as sodium chloride or sodium sulfate (Japanese Patent Application Laid-Open No. (sho.) 51-11138) have been disclosed, they also cause troubles in a grinding or washing step or have a disadvantage that it is difficult to prepare a high-quality pigment.

Meanwhile, as a process for preparing the $\alpha$-type pigment, pigmentation processes using sulfuric acid which is one of mineral acids have been known. That is, an acid pasting process of treating crude copper phthalocyanine in a state dissolved in a large amount of concentrated sulfuric acid and an acid slurry process of treating crude copper phthalocyanine with a large amount of sulfuric acid having a concentration insufficient for dissolving the pigment to form a sulfate are disclosed in U.S. Pat. Nos. 3,024,247, 2,770,629 and 2,334,812.

Further, Japanese Patent Application Laid-Open No. (hei.) 1-70568 discloses a process which comprises adding dry ground crude copper phthalocyanine which is intensively agglomerative to a 50 to 90% by weight aqueous solution of sulfuric acid to form a slurry of a sulfate thereof in the presence of a crystal growth inhibitor, adding water to this slurry to form a precipitate and thereby obtaining a pigment grade copper phthalocyanine. However, the application of this process is limited to the preparation of copper phthalocyanine having the $\alpha$ form.

Furthermore, Japanese Patent Application Laid-Open No. (sho.) 58-104960 discloses a process which comprises forming a slurry of dry ground chlorinated crude copper phthalocyanine containing 3 to 5% by weight of chlorine in a 50 to 60% by weight aqueous solution of sulfuric acid and pouring this slurry into water to obtain a copper phthalocyanine pigment. However, the pigments obtained by this process are also limited to copper phthalocyanine pigments each having the $\alpha$ form.

Although Japanese Patent Application Laid-Open No. (sho.) 60-31344 discloses a process which comprises dry grinding crude copper phthalocyanine together with a non-oxidizing acid and mixing the thus obtained pigment derivative with an organic solvent such as diethylene glycol, this process is disadvantageous in that the pigment particles cause excessive crystal growth in the presence of the solvent and that the solvent must be recovered.

SUMMARY OF THE INVENTION

The inventors of the present invention have intensively studied to solve the above problems and have found that a copper phthalocyanine pigment having the $\beta$ form alone or both $\alpha$ and $\beta$ forms mixedly which exhibits a high color strength and a high clarity can be prepared in a short time by carrying out the pigmentation of dry ground crude copper phthalocyanine in an aqueous solution of a mineral acid and that the content ratio of the $\alpha$ form to the $\beta$ form can be arbitrarily varied in a range in which the $\beta$ form can exist by changing the pigmentation conditions such as mineral acid concentration, temperature or treatment time. The present invention has been accomplished on the basis of these findings.

The present invention has been accomplished on the basis of a finding that a copper phthalocyanine pigment having the $\beta$ form can be prepared by dry grinding crude copper phthalocyanine and dipping or wet grinding the thus obtained dry ground crude copper phthalocyanine in an aqueous solution of a mineral acid. That is, the present invention provides a high-efficiency process for the preparation of copper phthalocyanine having the $\beta$ form.

The crude copper phthalocyanine to be used in the present invention may be any one prepared by a conventional process. For example, it can be prepared carrying out the reaction of phthalodinitrile or a derivative thereof with urea and a copper source of the reaction of phthalodinitrile or a derivative thereof with a copper source in the presence or absence of a catalyst (for example, ammonium molybdate, titanium tetrachloride or boron) in an organic solvent at a temperature of 120° to 270° C., preferably 170° C. to 230° C., under a normal or elevated pressure for 2 to 10 hours, though the process for the preparation thereof is not particularly limited. It is preferable that the crude copper phthalocyanine to be used in the present invention is chlorinated one containing chlorine not larger than 5% by weight.

The dry grinding is carried out by the use of a vibrating mill, attritor, ball mill or other grinder. If necessary, various grinding aids such as inorganic salt, resin, surfactant or organic solvent may be used. The grinding temperature is 20° to 130° C. The grinding at a temperature of below 20° C. is disadvantageous in respect of cooling cost, while the grinding at a temperature exceeding 130° C. is undesirable, because the copper phthalocyanate thus ground is difficult to deagglomerate finely when treated with an aqueous solution of a mineral acid.

Between the grinding temperature and the quality of the pigment, there is generally a relationship that a lower grinding temperature brings about a higher content of unstable crystal in the ground copper phthalocyanine.

The mineral acid to be used in the present invention as an aqueous solution may be sulfuric, hydrochloric or phosphoric acid. The concentration of the aqueous solution is 1 to 65% by weight with respect to sulfuric acid, 1 to 33% by weight with respect to hydrochloric acid and 1 to 35% by weight with respect to phosphoric acid. The aqueous solution may be preliminarily prepared. Alternatively, a mineral acid may be added to an aqueous slurry of the ground crude copper phthalocyanine.

The amount of the aqueous solution of a mineral acid to be used is not limited. For economic reasons, the concentration of the ground crude copper phthalocyanine may be kept in such a range that the resulting mixture is stirrable or grindable and incorporatable. The amount of the aqueous solution used is 1 to 20 times, preferably 5 to 15 times by weight as much as the ground crude copper phthalocyanine.

The treatment temperature is preferably 0° to 180° C. though it may be below 0° C. If the treatment temperature exceeds 180° C., the ground particles will cause excessive crystal growth to unfavorably result in coarse particles again.

The treatment conditions for pigmentation, such as mineral acid concentration and temperature, are suitably selected each in the range described above so as not to cause the transformation of the $\beta$ form contained in the dry ground crude copper phthalocyanine into the $\alpha$ one. The $\beta$ form content of the copper phthalocyanine after the pigmentation must be equal to or higher than that at dry grinding. The BET specific surface area of the copper phthalocyanine after dry grinding is at most 15 m$^2$/g, while that after the treatment with an aqueous solution of a mineral acid is at least 25 m$^2$/g, preferably at least 50 m$^2$/g.

Although the pigmentation time is at least 5 minutes and has no upper limit, it is preferably 30 to 360 minutes. If it is shorter than 5 minutes, the pigmentation will be insufficient to result in poor color strength and unclarity. The pigmentation for a longer time than 360 minutes is unfavorably uneconomical, though it is possible.

The wet grinding is carried out by the use of a sand mill, bead mill, wet attritor or other wet grinder.

The wet grinding makes the pigment particle finer and uniforms the particle shape to thereby improve the color strength and clarity thereof.

The pigment treated according to the above method is isolated by an ordinary process which comprises filtration, washing with water and drying. Of course, it may be used as such, i.e., in a wet state without being isolated. If necessary, during or after the treatment with an aqueous solution of a mineral acid, the pigment may be treated with an organic solvent or an aqueous emulsion thereof, a resin, surfactant or other additives.

The process for the preparation of a copper phthalocyanine pigment according to the present invention has the following advantages:

(1) the process gives a pigment which is composed of fine particles and has a large specific surface area, a high color strength and a high clarity, (2) the process of the present invention uses an inexpensive mineral acid which is suitable for massuse, thus being economical, (3) the process of the present invention need not use any organic solvent, so that it permits the simplification of waste water disposal and is advantageous in respects of fire prevention and workability, though the preparation of a copper phthalocyanine pigment having the $\beta$ form according to the prior art necessitates an organic solvent, (4) the size and shape of the pigment particle can be widely varied by changing the acid concentration and the treatment time, and (5) the content ratio of the $\alpha$ form to the $\beta$ form can be arbitrarily varied by changing the $\alpha$ form content of the crude copper phthalocyanine at dry grinding, acid concentration and treatment temperature. Thereby, the hue of the resulting pigment can be widely adjusted in a range of from greenish blue (the color of the $\beta$ form) to reddish blue (the color of the $\alpha$ form). Thus, the process of the present invention is highly valuable as a process for preparing the pigment on an industrial scale.

The copper phthalocyanine pigment prepared by the process of the present invention can be widely used as a colorant for printing ink, plastic or coating material.

The present invention will now be described in more detail by referring to the following Examples, though the present invention is not limited by them. In the Examples, all parts and percentages are by weight.

EXAMPLE 1

Crude copper phthalocyanine prepared by the urea method was dry ground in an attritor at a temperature of 45° to 55° C. for one hour. One part of the crude copper phthalocyanine thus ground was added to 10 parts of a 10% aqueous solution of sulfuric acid. The obtained mixture was stirred at 100° C. for 120 minutes and filtered. The filter cake was washed with water until it became free from acid. The resulting filter cake was dried at 90° to 100° C. to obtain 0.95 part of a pigment. This pigment exhibited a high color strength for an oil ink (rosin-modified phenolic resin).

COMPARATIVE EXAMPLE 1

The same crude copper phthalocyanine as that used in Example 1 was dry ground and evaluated as such in a similar manner to that of Example 1. The obtained pigment exhibited only a very low color strength for an oil ink.

COMPARATIVE EXAMPLE 2

A pigment was prepared by the same process as that of Example 1 except that an oil-in-water emulsion of xylene was used instead of the 10% aqueous solution of sulfuric acid. This pigment exhibited a color strength lower than that of the pigment prepared in Example 1 for an oil ink.

EXAMPLE 2

The same procedure as that described in Example 1 was repeated except that a mixture comprising a 30% aqueous solution of sulfuric acid and a 20% aqueous solution of hydrochloric acid at a ratio of 1:1 was used instead of the aqueous solution of sulfuric acid. The obtained pigment gave results nearly equal to those of Example 1.

EXAMPLE 3

The same procedure as that described in Example 1 was repeated except that a 30% aqueous solution of phosphoric acid was used instead of the aqueous solution of sulfuric acid. The obtained pigment gave results nearly equal to those of Example 1.

EXAMPLE 4

A mixture comprising 8 parts of crude copper phthalocyanine prepared by the urea method and 2 parts of sodium sulfate was ground in an attritor at 45° to 55° C. for one hour. One part of the mixture thus ground was added to 10 parts of a 60% aqueous solution of sulfuric acid. The obtained mixture was kept at 20° C. for 30 minutes and subjected to the same filtration, washing with water and drying as those of Example 1 to obtain 0.78 part of a pigment. This pigment exhibited a high clarity and a high color strength for an oil ink.

EXAMPLE 5

Crude copper phthalocyanine prepared by the urea method was dry ground in a ball mill at 30° to 40° C. for 35 hours. One part of the crude copper phthalocyanine thus ground was added to 20 parts of a 30% aqueous solution of hydrochloric acid. The obtained mixture was kept at 100° C. for 180 minutes and subjected to the same filtration, washing with water and drying as those of Example 1 to obtain 0.95 part of a pigment. This pigment exhibited a high color strength for a plastic (polyvinyl chloride).

EXAMPLE 6

Crude copper phthalocyanine prepared by the urea method was continously dry ground in a vibrating mill at 55° to 60° C. One part of the crude copper phthalocyanine thus ground was added to 5 parts of a 50% aqueous solution of sulfuric acid. The obtained mixture was stirred at 150° C. under an enhanced pressure for 60 minutes and subjected to the same filtration, washing with water and drying as those of Example 1 to obtain 0.95 part of a pigment.

This pigment exhibited a high clarity and a high strength for an oil ink.

EXAMPLE 7

One part of the ground crude copper phthalocyanine prepared in Example 4 was added to 15 parts of a 40% aqueous solution of sulfuric acid. The obtained mixture was stirred at 100° C. for 150 minutes, followed by the addition of 0.1 part of a cationic surfactant (quaternary ammonium salt). The resulting mixture was filtered, washed with water and dried each in a similar manner to that of Example 1 to obtain one part of a pigment.

This pigment exhibited a high color strength for an oil ink.

EXAMPLE 8

One part of the ground copper phthalocyanine prepared in Example 4 was added to 3 parts of a 55% aqueous solution of sulfuric acid. The obtained mixture was stirred at 30° C. for 120 minutes and subjected to the same filtration, washing with water and drying as those of Example 1 to obtain 0.95 part of a pigment.

This pigment exhibited a high color strength for a publication gravure ink (of lime-rosin type).

EXAMPLE 9

A mixture comprising one part of the ground crude copper phthalocyanine prepared in Example 1 and 5 parts of a 45% aqueous solution of sulfuric acid was wet ground in a wet grinder at 80° C. for 60 minutes and subjected to the same filtration, washing with water and drying as those of Example 1 to obtain 0.93 part of a pigment.

This pigment exhibited a high clarity and a high color strength for a gravure ink (of water-base resin type).

EXAMPLE 10

Crude copper phthalocyanine (chlorine content: 3%) prepared by the urea method was dry ground in a ball mill at 30° to 40° C. for 30 hours. One part of the crude copper phthalocyanine thus ground was added to 10 parts of a 55% aqueous solution of sulfuric acid. The obtained mixture was wet ground in a ball mill at 30° C. for 300 minutes and subjected to the same filtration, washing with water and drying as those of Example 1 to obtain 0.94 part of a pigment.

This pigment exhibited a high clarity and a high color strength for a coating material (alkyd-melamine type).

EXAMPLE 11

One part of the ground crude copper phthalocyanine prepared in Example 1 was added to 15 parts of a 35% aqueous solution of sulfuric acid. The obtained mixture was wet ground in a sand mill at 40° C. for 60 minutes and subjected to the same filtration, washing with water and drying as those of Example 1 to obtain 0.93 part of a pigment.

This pigment exhibited a high clarity and a high color strength for an oil ink.

EXAMPLE 12

The same procedure as that of Example 7 was repeated except that the stirring was replaced by wet drying using a bead mill. Thus, 0.98 part of a pigment was obtained.

This pigment exhibited a high clarity and a high color strength for an oil ink.

Table 1 shows the kinds of crude pigments and the conditions of dry grinding and mineral acid treatment employed in the Examples 1 to 12 and Comparative Examples 1 and 2.

Table 2 shows the β form content (at dry grinding and after mineral acid treatment), BET specific surface area (at dry grinding and after mineral acid treatment), evaluation method, color strength and clarity with respect to the pigments prepared in the Examples 1 to 12 and Comparative Examples 1 and 2.

The β form content Xβ is calculated according to the equation:

$$X\beta = (S\beta/(S\alpha + S\beta)) \times 100 (\%)$$

wherein Sα stands for a peak area (2θ=15.6° and 16.6°) with respect to the α form and Sβ stands for a peak area (2θ=18.1° and 18.4°) with respect to the β form determined in the X-ray diffraction pattern.

The ink evaluation methods are as follows:

Oil ink: A pigment was dispersed in a resin varnish with a Hoover muller to obtain a deep color ink having a pigment content of 20%. This ink was cut with a white ink so as to give a ratio of the blue pigment to the white ink of 1/10. The L*, a* and b* values were measured with a color machine.

Plastic: A pigment was dispersed in a plasticizer (dioctyl phthalate) with a Hoover muller to obtain a color paste having a pigment content of 40%. This color paste was mixed with white polyvinyl chloride so as to give a ratio of the blue pigment to the white pigment of 1/10. The obtained mixture was kneaded with a two roller mill and molded into a sheet. The L*, a* and b* values were measured with a color machine.

Gravure ink: 10 parts of a pigment was dispersed in 90 parts of a gravure ink varnish with a paint conditioner. The obtained ink was cut with a white ink so as to give a ratio of the blue pigment to the white pigment of 1/10. The resulting ink was developed on a coated paper when the ink is of a lime-rosin type and on a manila board when the ink is of water-base resin type. The L*, a* and b* values were measured with a color machine.

Coating material: 6 parts of a pigment was dispersed in 94 parts of a baking amino-alkyd resin varnish with a paint conditioner. The obtained enamel was cut with a white enamel so as to give a ratio of the blue pigment to the white pigment of 1/10. The resulting enamel was developed on a coated paper and baked to determine the L*, a* and b* values with a color machine.

The color strength (CS) was determined by calculation according to the following equation:

$$CS(\%) = 10 \; EXP \; [\{L^* (standard) - L^* (sample)\}/-25 + 2]$$

A larger value of CS indicates a higher color strength. Meanwhile, the clarity (CL) was determined by calculation according to the following equation:

$$CL(\%) = 100 \times C^* (sample)/C^* (standard)$$

$$(\text{wherein } C^* = \sqrt{a^{*2} + b^{*2}})$$

A larger value of CL indicates a higher clarity.

TABLE 1

| Ex. and Comp. Ex | Crude copper phthalocyanine | Dry grinding | | | | Mineral acid treatment | | | |
|---|---|---|---|---|---|---|---|---|---|
| | | Equipment | temp. | hour | *aid | Concentration and method | temp. | hour | other condition |
| Ex. 1 | chlorine-free | attritor | 45-55° C. | 1 h | none | dipping in 10% sulfuric acid | 100° C. | 2.0 h | — |
| Comp. Ex. 1 | chlorine-free | attritor | 45-55 | 1 | none | — | — | — | — |
| Comp. Ex. 2 | chlorine-free | attritor | 45-55 | 1 | none | — | — | — | treatment with emulsion |
| Ex. 2 | chlorine-free | attritor | 45-55 | 1 | none | dipping in 30% sulfuric acid/ 20% hydrochloric acid mixture | 100 | 2.0 | — |
| Ex. 3 | chlorine-free | attritor | 45-55 | 1 | none | dipping in 30% phosphoric acid | 100 | 2.0 | — |
| Ex. 4 | chlorine-free | attritor | 45-55 | 1 | used | dipping in 60% sulfuric acid | 20 | 0.5 | — |
| Ex. 5 | chlorine-free | ball mill | 30-40 | 35 | none | dipping in 30% hydrochloric acid | 100 | 3.0 | — |
| Ex. 6 | chlorine-free | vibrating mill | 55-60 | cont. | none | dipping in 50% sulfuric acid | 150 | 1.0 | — |
| Ex. 7 | chlorine-free | attritor | 45-55 | 1 | none | dipping in 40% sulfuric acid | 100 | 2.5 | addition of surfactant |
| Ex. 8 | chlorine-free | attritor | 45-55 | 1 | used | dipping in 55% sulfuric acid | 30 | 2.0 | — |
| Ex. 9 | chlorine-free | attritor | 45-55 | 1 | none | grinding in 45% sulfuric acid | 80 | 1.0 | — |
| Ex. 10 | semi-chloro | ball mill | 30-40 | 30 | none | grinding in 55% sulfuric acid | 30 | 5.0 | — |
| Ex. 11 | chlorine-free | attritor | 45-55 | 1 | none | grinding in 35% sulfuric acid | 40 | 1.0 | — |
| Ex. 12 | chlorine-free | attritor | 45-55 | 1 | used | grinding in 40% sulfuric acid | 100 | 2.5 | addition of surfactant |

*aid ... sodium sulfate was used.

TABLE 2

| Ex. and Comp. Ex. | β form copper phthalocyanine content | | BET specific surface area (m²/g) | | Ink test | | |
|---|---|---|---|---|---|---|---|
| | at dry grinding | after mineral acid treatment | at dry grinding | after mineral acid treatment | evaluation method | color strength (%) | clarity (%) |
| Ex. 1 | 35 | 70 | 8.2 | 55.4 | oil ink | 135 | 122 |
| Comp. Ex. 1 | 35 | 35 | 8.2 | 8.2 | oil ink | 60 | 50 |
| Comp. Ex. 2 | 35 | 100 | 8.2 | 30.0 | oil ink | 100 | 100 |
| Ex. 2 | 35 | 66 | 8.2 | 54.7 | oil ink | 130 | 120 |
| Ex. 3 | 35 | 72 | 8.2 | 57.6 | oil ink | 132 | 119 |
| Ex. 4 | 25 | 30 | 7.5 | 68.2 | oil ink | 125 | 115 |
| Ex. 5 | 35 | 80 | 8.5 | 56.0 | plastic | 150 | 130 |

TABLE 2-continued

| Ex. and Comp. Ex. | β form copper phthalocyanine content | | BET specific surface area (m²/g) | | Ink test | | |
|---|---|---|---|---|---|---|---|
| | at dry grinding | after mineral acid treatment | at dry grinding | after mineral acid treatment | evaluation method | color strength (%) | clarity (%) |
| Ex. 6 | 35 | 100 | 8.0 | 68.5 | oil ink | 140 | 130 |
| Ex. 7 | 25 | 100 | 7.5 | 63.8 | oil ink | 135 | 125 |
| Ex. 8 | 25 | 30 | 7.5 | 69.7 | gravure ink | 120 | 113 |
| Ex. 9 | 35 | 100 | 8.2 | 71.3 | gravure ink | 150 | 140 |
| Ex. 10 | 35 | 40 | 8.8 | 52.9 | coating material | 145 | 130 |
| Ex. 11 | 35 | 35 | 8.2 | 64.1 | oil ink | 140 | 125 |
| Ex. 12 | 25 | 100 | 7.5 | 70.0 | oil ink | 148 | 135 |

What is claimed is:

1. A process for the preparation of a copper phthalocyanine pigment comprising both the α and the β forms and containing the β form of from 30 to 80% by weight, which consists of:
   dry grinding chlorine free crude copper phthalocyanine to obtain a dry ground mixture of the α and the β forms:
   dipping the dry ground mixture with an aqueous solution of a mineral acid for at least 5 minutes in which the amount of the aqueous solution is 1 to 20 times by weight as much as the dry ground mixture and the mineral acid is a member selected from the group consisting of:
   (1) 1 to 60% by weight aqueous solution of sulfuric acid;
   (2) 1 to 30% by weight aqueous solution of hydrochloric acid;
   (3) 1 to 35% by weight aqueous solution of phosphoric acid;
   or mixtures thereof whereby the BET specific surface area is increased and removing the mineral acid from the resulting mixture containing the copper phthalocyanine in α and the β forms and the mineral acid by filtering and washing with water.

2. The process according to claim 1 wherein said step 1) is carried out at a temperature between 20° and 130° C.

3. The process according to claim 1 wherein the temperature in step 2) is 0°–180° C.

4. The process according to claim 1 wherein the BET specific surface area of the dry ground copper phthalocyanine obtained in step 1) is at most 15 m²/g and is increased in step 2) to at least 25 m²/g.

5. The process according to claim 1 wherein the dry ground crude copper phthalocyanine is treated with said aqueous solution of a mineral acid by dipping it in the solution.

6. The process according to claim 1 wherein the dry ground crude copper phthalocyanine is treated with said aqueous solution of a mineral acid by wet grinding it in the solution.

7. The process according to claim 1 wherein in step 2) said dry ground mixture is dipped in 10 parts of 10% aqueous sulfuric acid at 100° C. for at least five minutes and the resulting mixture contains 70% of the copper phthalocyanine in the β-form.

8. The process according to claim 1 wherein in step 2) said dry ground mixture is dipped in a mixture of 30% sulfuric acid and 20% hydrochloric acid in the ration of 1:1, and the resulting mixture contains 66% of the copper phthalocyanine in the β form.

9. The process according to claim 1 wherein in step 2) said dry ground mixture is dipped in 60% sulfuric acid at 20° C. and the resulting mixture contains 30% of the copper phthalocyanine in the β form.

10. The process according to claim 1 wherein in step 2) the dry ground mixture is dipped in 55% sulfuric acid at 30° C. and the resulting mixture contains 30% of the phthalocyanine in the β form.

11. The process according to claim 1 wherein in step 2) the dry ground mixture is dipped in 35% sulfuric acid at 40° C. and the resulting mixture contains 35% of the phthalocyanine in the β form.

* * * * *